United States Patent
Choi et al.

(10) Patent No.: US 8,243,169 B2
(45) Date of Patent: Aug. 14, 2012

(54) APPARATUS AND METHOD FOR IMPROVED DIGITAL IMAGE PLAYBACK

(75) Inventors: Jun-ho Choi, Suwon-si (KR); Hye-jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 12/488,735

(22) Filed: Jun. 22, 2009

(65) Prior Publication Data

US 2010/0039531 A1   Feb. 18, 2010

(30) Foreign Application Priority Data

Aug. 13, 2008  (KR) .................. 10-2008-0079446

(51) Int. Cl.
*H04N 5/76* (2006.01)
*H04N 5/222* (2006.01)
(52) U.S. Cl. .................... 348/231.9; 348/333.05
(58) Field of Classification Search ........... 348/231.2, 348/231.8, 333.05, 231.9
See application file for complete search history.

(56) References Cited

U.S. PATENT DOCUMENTS

| | | | |
|---|---|---|---|
| 6,683,649 B1 * | 1/2004 | Anderson | 348/333.05 |
| 8,098,296 B2 * | 1/2012 | Nozawa | 348/333.05 |
| 2003/0063198 A1 * | 4/2003 | Yokokawa | 348/231.2 |
| 2006/0059426 A1 * | 3/2006 | Ogikubo | 715/723 |

* cited by examiner

*Primary Examiner* — Trung Diep
(74) *Attorney, Agent, or Firm* — Drinker Biddle & Reath LLP (57) ABSTRACT

Disclosed are an apparatus and method for improving digital image playback by switching among a plurality of displayed playback images according to a control signal generated from a user input. The apparatus includes a playback image generating unit (in an embodiment, a digital signal processor), which generates a playback image by using image data included in an image file. A display unit displays the playback image generated by the playback image processor. A detecting unit determines the duration of the control signal generated from the user input, and the playback image generating unit adjusts a specified speed of switching among a plurality of playback images according to the input of the control signal and the specified speed of switching playback images is adjusted according to the detected duration.

15 Claims, 10 Drawing Sheets

FIG. 1A

RELATED ART

FIG. 1B

RELATED ART

APPARATUS AND METHOD FOR IMPROVED DIGITAL IMAGE PLAYBACK

CROSS-REFERENCE TO RELATED PATENT APPLICATION

This application claims the benefit of Korean Patent Application No. 10-2008-0079446, filed on Aug. 13, 2008, in the Korean Intellectual Property Office, the disclosure of which is incorporated herein in its entirety by reference.

BACKGROUND OF THE INVENTION

1. Field of the Invention

The present invention relates to a digital image processing apparatus and a method of controlling the same. More particularly, the present invention relates to a digital image processing apparatus and method that switches among a plurality of playback images according to a control signal generated by a user input in an image playback mode.

2. Description of the Related Art

Portability of digital image processing apparatuses, such as digital cameras and camcorders, has been improved due to miniaturization and technological developments in related fields such as batteries. Thus, images can be captured anywhere. Furthermore, various features are provided with digital image processing apparatuses today such that even beginners can take high-quality images.

Meanwhile, technological developments in storage media have decreased the physical size of storage media while dramatically increasing storage capacity. A user can now store thousands of images on a single recording medium, such as a secure digital (SD) card, a memory stick, etc.

When hundreds or thousands of images are stored on a storage medium, however, users have difficulty finding specific images.

Figure 1A:
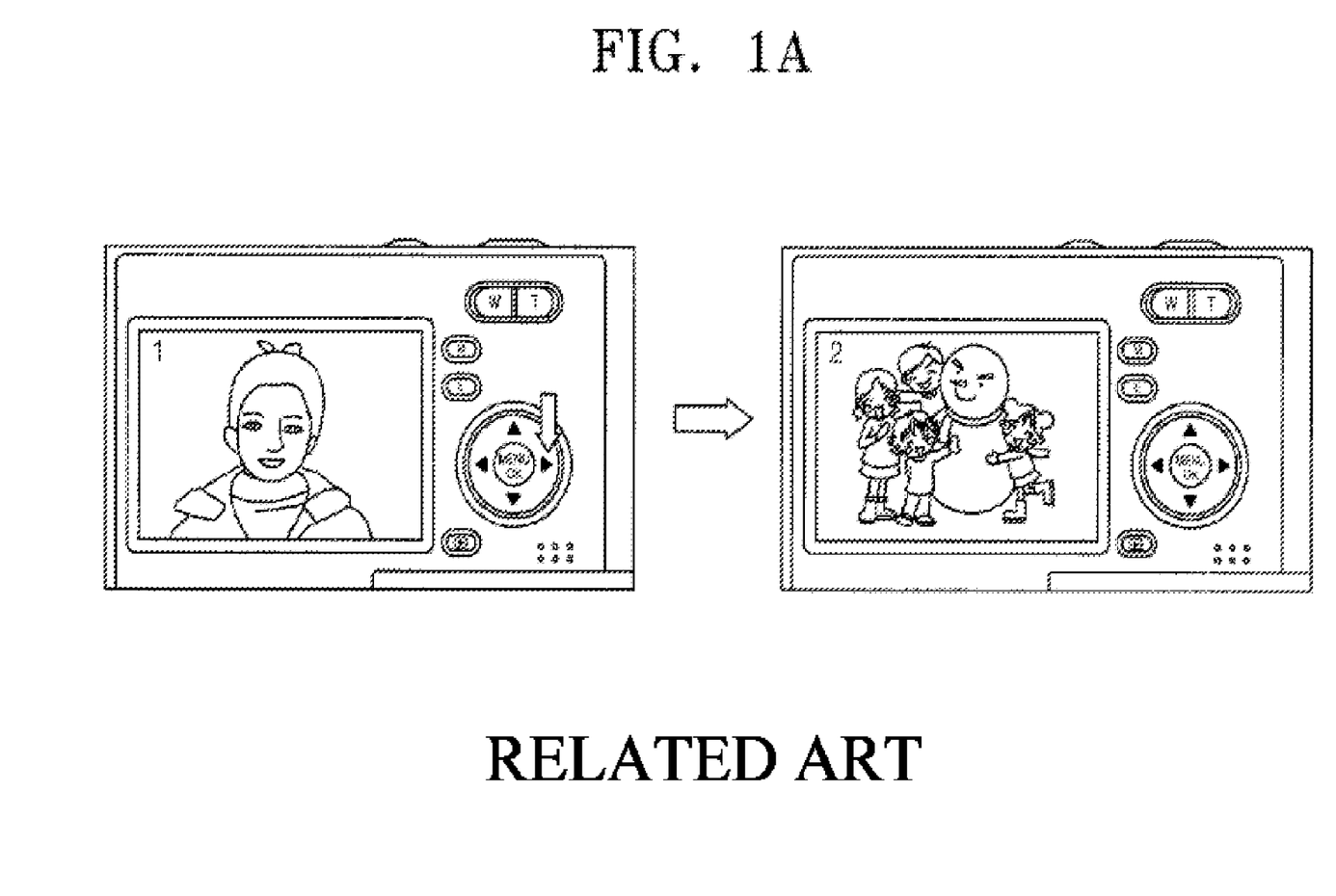
FIG. 1A is a diagram showing that displayed playback images are switched in an image playback mode in a conventional digital image processing apparatus.

FIG. 1A is a diagram showing how displayed playback images are switched in an image playback mode in a conventional digital image processing apparatus.

When a directional key is pressed to switch a displayed playback image, a playback image after the displayed playback image is displayed.

Conventional image playback often requires an inconveniently long amount of time for browsing images. For example, when a storing medium includes 1,000 image files and a user wants to display the $500^{th}$ image file of the 1,000 image files, a directional key must be pressed 500 times.

Figure 1B:
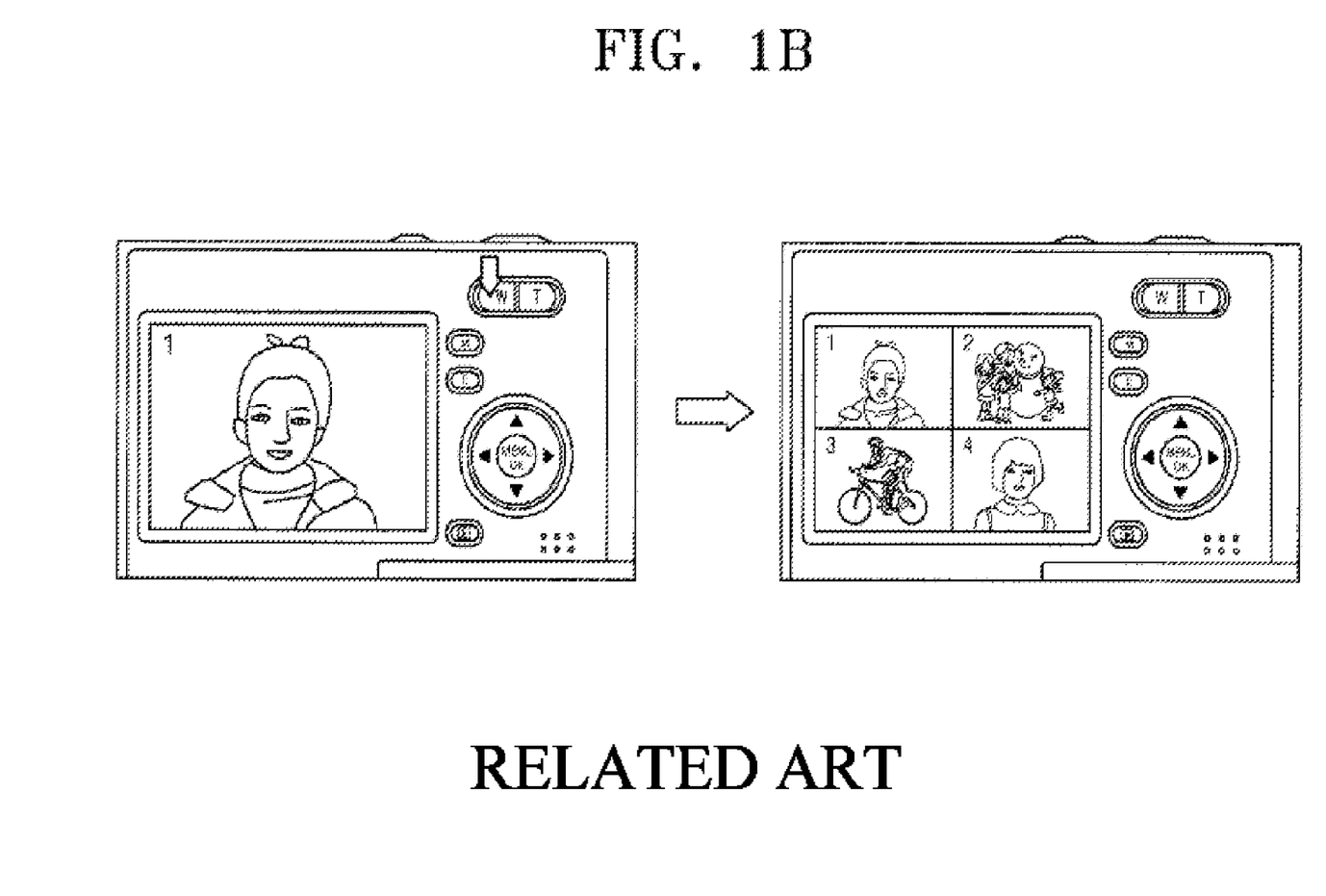
FIG. 1B is a diagram showing that a plurality of images are simultaneously displayed as thumbnails on a conventional digital image processing apparatus in an image playback mode.

Another conventional image playback mode is shown in FIG. 1B. In FIG. 1B, a plurality of images are simultaneously displayed as thumbnails on a conventional digital image processing apparatus in an image playback mode. In this mode, a user can browse images faster as compared to the case where only one image is displayed at a time. However, the method shown in FIG. 1B cannot sufficiently reduce the time taken to display desired image from among the images.

SUMMARY OF THE INVENTION

The present invention provides a digital image processing apparatus with which a user can easily find desired images from among a plurality of image files and a method of controlling the digital image processing apparatus.

According to an aspect of the present invention, there is provided an apparatus for digital image playback, which includes a playback image generating unit, a display unit, a user input unit, and a detecting unit. The detecting unit determines the duration of a control signal generated by the user input unit, and supplies duration information to the playback image generating unit. The playback image generating unit then varies the speed of switching among the displayed images in accordance with the determined duration of the control signal.

In some embodiments, the speed of switching may vary continuously as a linear or nonlinear function of the duration of the control signal. In other embodiments, the speed of switching may vary in discrete steps as the duration of the control signal increases past specified thresholds.

To provide users of the present invention with a visual cue as to the current duration of the control signal (and hence speed of switching), in some embodiments, the size of displayed images may be decreased as the speed of switching increases. Separately, the edges of images may be joined so that more than one image may be displayed simultaneously during switching. The present invention includes embodiments in which switching among playback images ends immediately after the control signal has ceased.

According to another aspect of the present invention, there is provided a method of controlling a digital image processing apparatus that generates a playback image by using image data included in an image file and displays the playback image. The method includes steps of switching a currently displayed playback image to either a next playback image or a previous playback image, in response to a control signal input by a user, and changing a speed of switching playback images according to a duration of inputting the control signal.

In some embodiments of the method of the present invention, the speed of switching playback images is changed continuously as the duration of inputting the control signal increases. In others, the speed of switching playback images is changed step-by-step as the duration of inputting the control signal increases.

In some embodiments of the method, an edge of the currently displayed playback image and an edge of either the next playback image or the previous playback image are connected before the images are switched.

According to the method of the present invention, in some embodiments the switching of images ceases when the control signal ceases.

In addition, the displayed size of a playback image is reduced as the speed of switching playback images increases in some embodiments of the method of the present invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Referring to FIGS. 2A through 8, exemplary embodiments of the present invention will be described hereinafter.

Figure 2A:
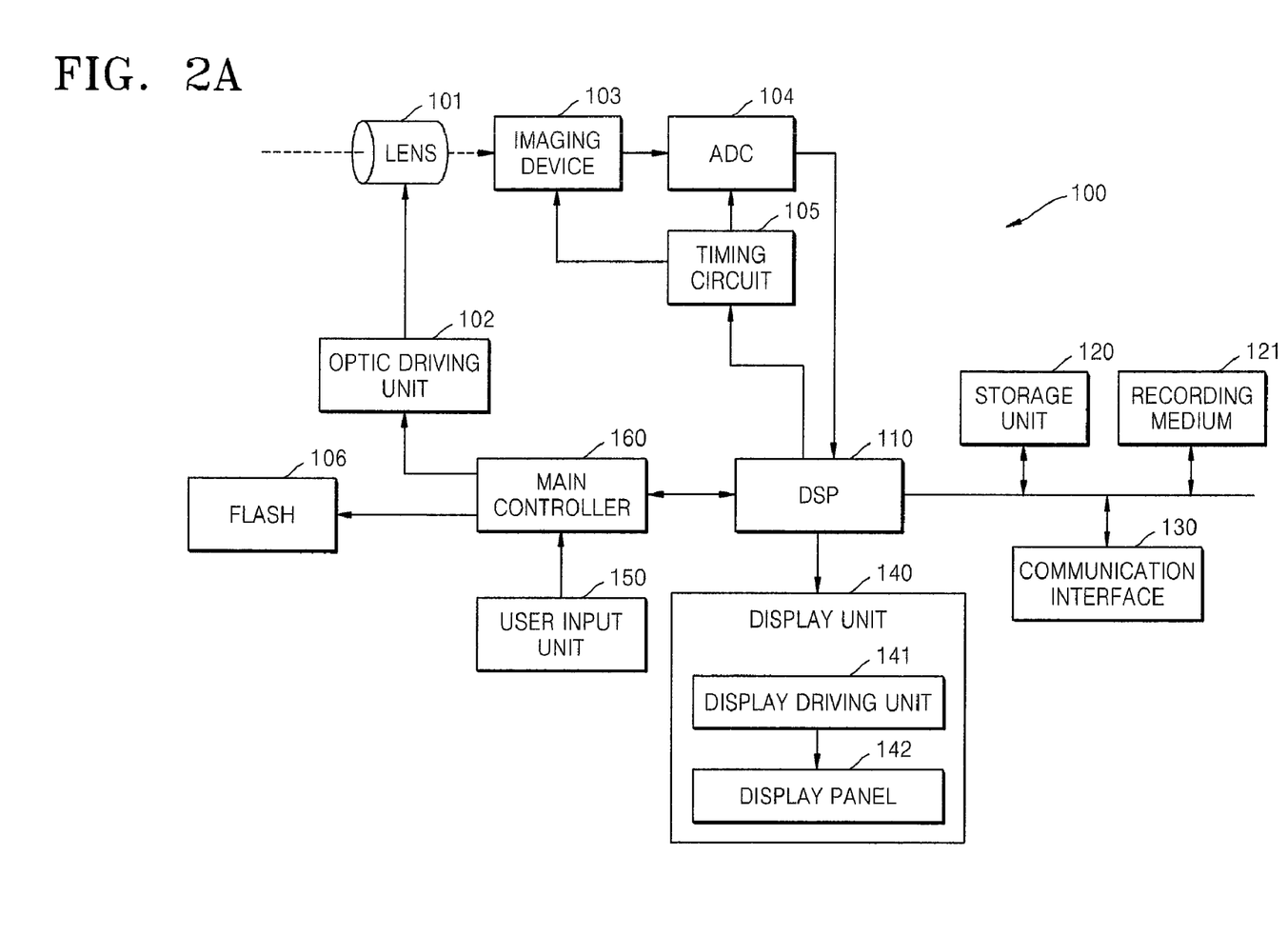
FIG. 2A is a block diagram illustrating the internal configuration of a digital image processing apparatus, according to an embodiment of the present invention.
Figure 2B:
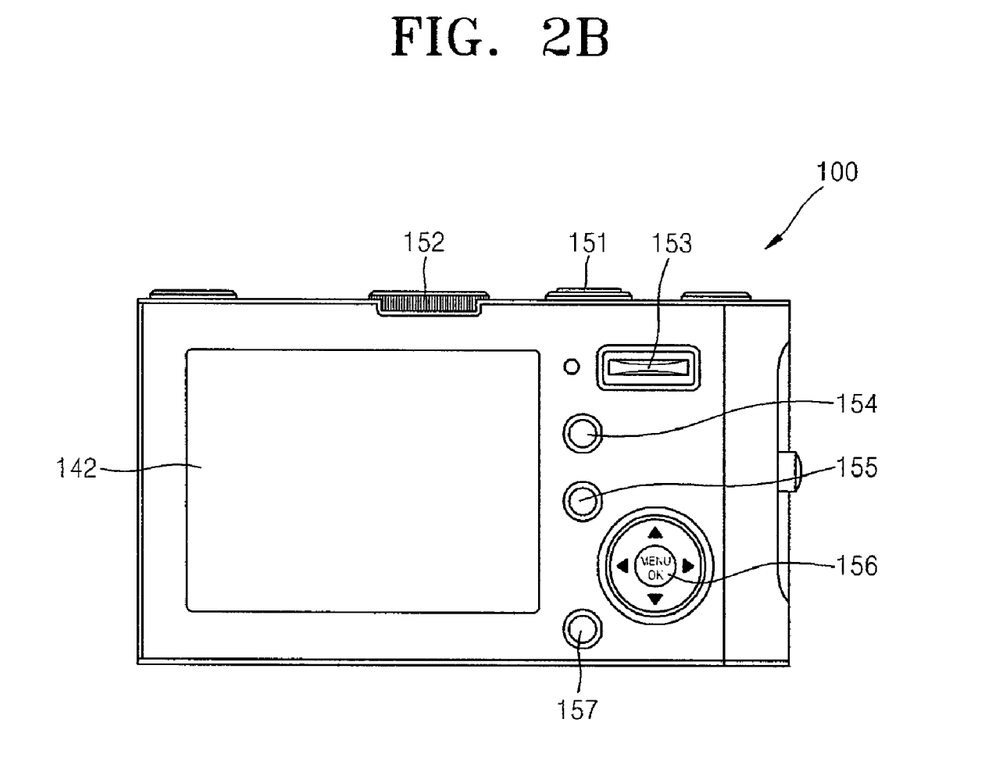
FIG. 2B is a rear view of the digital image processing apparatus.

FIG. 2A is a block diagram illustrating the internal configuration of a digital image processing apparatus 100, according to an embodiment of the present invention, and FIG. 2B is a rear view of the digital image processing apparatus 100.

Referring to FIGS. 2A and 2B, internal and external configurations of the digital image processing apparatus 100 will be described below.

A lens 101 is a component transmitting imaging light of a subject to form an image on an imaging device 103.

An optic driving unit 102 includes a motor driving a zoom motor, an iris, etc., which are to control focus, exposure, etc., according to a signal applied by a main controller 160 described below.

The imaging device 103 converts light transmitted through the lens 101 into electrical signals. The imaging device 103 may be a complementary metal oxide semiconductor (CMOS) or a charge coupled device (CCD).

An analogue-digital converter (ADC) 104 converts analogue signals, which are the electrical signals converted from the light by the imaging device 103, to digital signals.

A timing circuit 105 controls operations of the imaging device 103 and the ADC 104.

A flash 106 momentarily emits light with a high intensity to temporarily brighten a subject when an image is being captured in dark surroundings. Flash modes when using the flash 106 may include auto-flash mode, compulsory flash mode, red-eye reduction mode, slow synchronization mode, etc.

A digital signal processor (DSP) 110 is a unit processing various digital signals according to control signals applied by the main controller 160 described below. The various digital signals may include an image signal generated by the imaging device 103 and converted to a digital signal by the ADC 104, a voice signal applied by a microphone (not shown), a digital signal applied by a storage unit 120 or a memory card 122 (not shown), etc.

Meanwhile, the DSP 110 performs a series of signal processes, such as white balance process, noise removal, color correction, etc., to an image signal applied by the imaging device 103 and the ADC 104, so that the image signal is converted to image data.

Furthermore, when an input signal from a shutter-release button 151, which will be described below, is applied to the main controller 160 and a control signal corresponding to the input signal is applied to the DSP 110, the DSP 110 can generate an image file by using the image data. The image file may be generated in joint photographic experts group (JPEG) format. An image file compressed in the JPEG format may include original image data and thumbnail image data, which includes an image smaller than an image included in the original image data. However, it is not limited to include just one thumbnail image data, and the image file may include thumbnail image data with various sizes. The storage unit 120 may store various signals, various data, algorithms, etc., for driving the digital image processing apparatus 100. A random access memory (RAM) may be used as a storage unit temporarily storing the data, and the RAM may be a dynamic RAM (DRAM), for example. Also, an electrically erasable and programmable read only memory (EEPROM) may be used as a storage unit to store the algorithms.

A recording medium 121 may store image files. The recording medium 121 may be either an internal unit or a detachable external unit. In case of a detachable external unit, the recording medium may be a memory card, a memory stick, etc.

A communication interface 130 is an interface capable of exchanging data and signals with an external device, the interface such as a universal serial bus (USB) interface.

A display unit 140 is a unit for displaying subjects, user interfaces (UI) provided according to a user's button operations, live view images in live view mode, and playback images in image playback mode. The display unit 140 may include a display driving unit 141 that controls a display panel 142 to display images that are viewable on the display panel 142 to a user.

The display panel 142 is formed of a liquid crystal display (LCD) and shows images of a subject in real time. Furthermore, the display panel 142 displays status information of the digital image processing apparatus 100. Although the display panel 142 is formed of a LCD in the current embodiment, the present invention is not limited thereto, and thus, the display panel 142 may be formed of an organic light-emitting diode (OLED), a field emission display (FED), etc.

A user input unit 150 includes various key buttons and/or dials, and is used by a user to operate desired functions of the digital image processing apparatus 100.

The shutter-release button 151 generates an image capturing signal according to an input of a user. When the image capturing signal is applied to the main controller 160, the DSP 100 generates an image file by using image data.

A mode dial 152 is used by a user to select various image capture modes.

A zoom button 153 performs a zooming-in operation or a zooming-out operation in image capture mode. Furthermore, in image playback mode, a displayed playback image may be magnified by operating the zoom button 153 to perform the zooming-in operation, and thumbnail images may be displayed by operating the zoom button 153 to perform the zooming-out operation. In the digital image processing apparatus 100 of FIG. 2B, the zoom button 153 may be operated upward or downward to perform the operations described above. However, the present invention is not limited thereto, and various changes in form and details may be made thereto.

Furthermore, the user input unit 150 may include a E (special effect) button 154, a function button 156, and a playback mode button 157.

The buttons above are merely examples, and various configurations and shapes are possible.

Also, the function button 156 may be a button for applying a control signal instructing to switch a displayed playback image in image playback mode. When a user applies a control signal by pressing the left side of the function button 156, a currently displayed playback image may be switched to a previous image. Furthermore, when a user applies a control signal by pressing the right side of the function button 156, a currently displayed playback image may be switched to a next image.

The previous image and the next image stated above may refer to an image included in an image file previous to an image file corresponding to the currently displayed playback image and an image included in an image file next to the image file corresponding to the currently displayed playback image, respectively.

Although in the current embodiment of the present invention, a displayed playback image is switched by the function button 156, the present invention is not limited thereto, and the displayed playback image may be switched by other buttons.

The main controller 160 controls the digital image processing apparatus 100 overall. The main controller 160 may receive an input signal from the user input unit 150, generate a control signal corresponding to the input signal, and apply the control signal to where the control signal is required to be applied, that is, the optic driving unit 102, the DSP 110, etc., for example.

Meanwhile, the digital image processing apparatus 100 according to the current embodiment of the present invention includes a playback image generating unit (not shown) generating a playback image in image playback mode by using image data included in an image file. The playback image generating unit may be a part of the DSP 110. However, the present invention is not limited thereto, and various changes can be made thereto; i.e., the playback image generating unit may be a separate component from the DSP 110.

Furthermore, the digital image processing apparatus 100 according to the current embodiment of the present invention includes a detecting unit (not shown) detecting the duration that control signals to switch displayed playback images are continuously applied from the user input unit 150, that is, the duration of inputting control signals. The detecting unit may be a part of the main controller 160. However, the present invention is not limited thereto, and various changes can be made therein; i.e., the detecting unit may be a separate component from the main controller 160.

The playback image generating unit retrieves image data from an image file stored in a recording medium, etc., when a signal instructing to change a current mode to image playback mode is applied by the user input unit 150, and generates a playback image by using the retrieved image data. Furthermore, when a control signal instructing to switch a displayed playback image is applied by the user input unit 150, the playback image generating unit generates a playback image corresponding to a new image file, and the generated playback image is provided to the display unit 140.

Also, FIGS. 2A and 2B illustrate a compact digital camera, which is a digital camera having a lens integrated to a main body, as an example of the digital image processing apparatus 100 according to the current embodiment of the present invention. However, the present invention is not limited thereto. In other words, a digital image processing apparatus according to an embodiment of the present invention may be a single-lens reflex camera including a detachable a lens.

Figure 3:
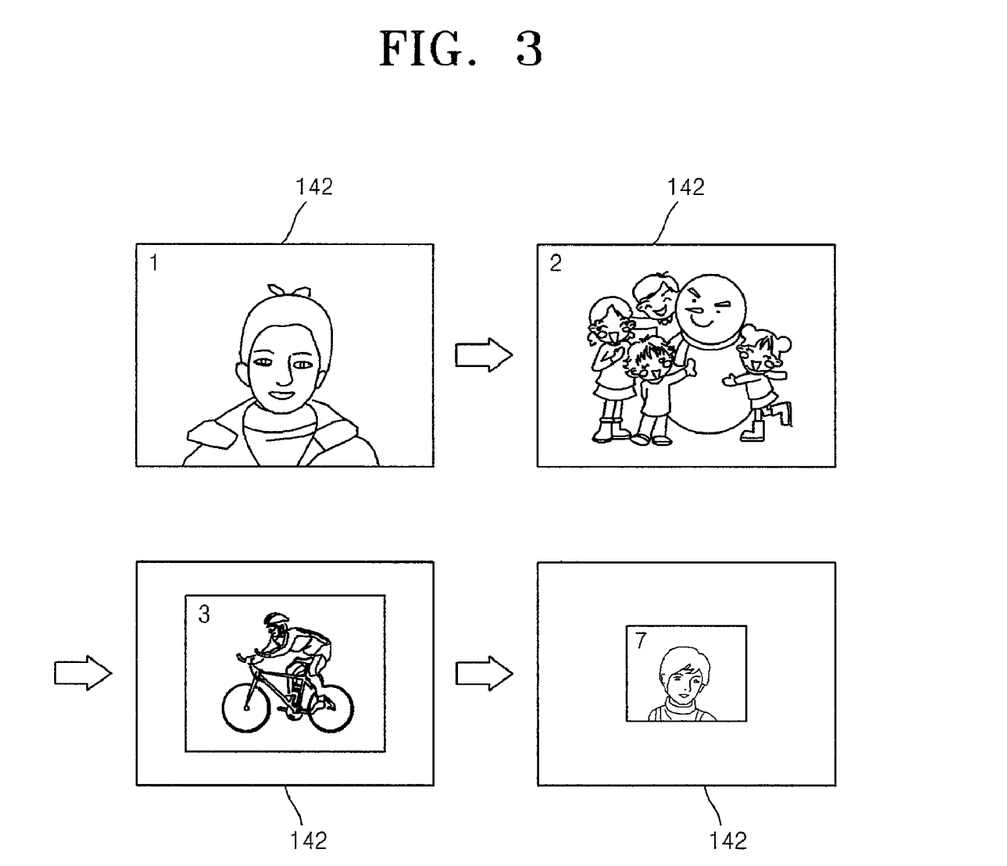
FIG. 3 is a diagram showing a method of browsing images in the digital image processing apparatus, according to an embodiment of the present invention.
Figure 4:
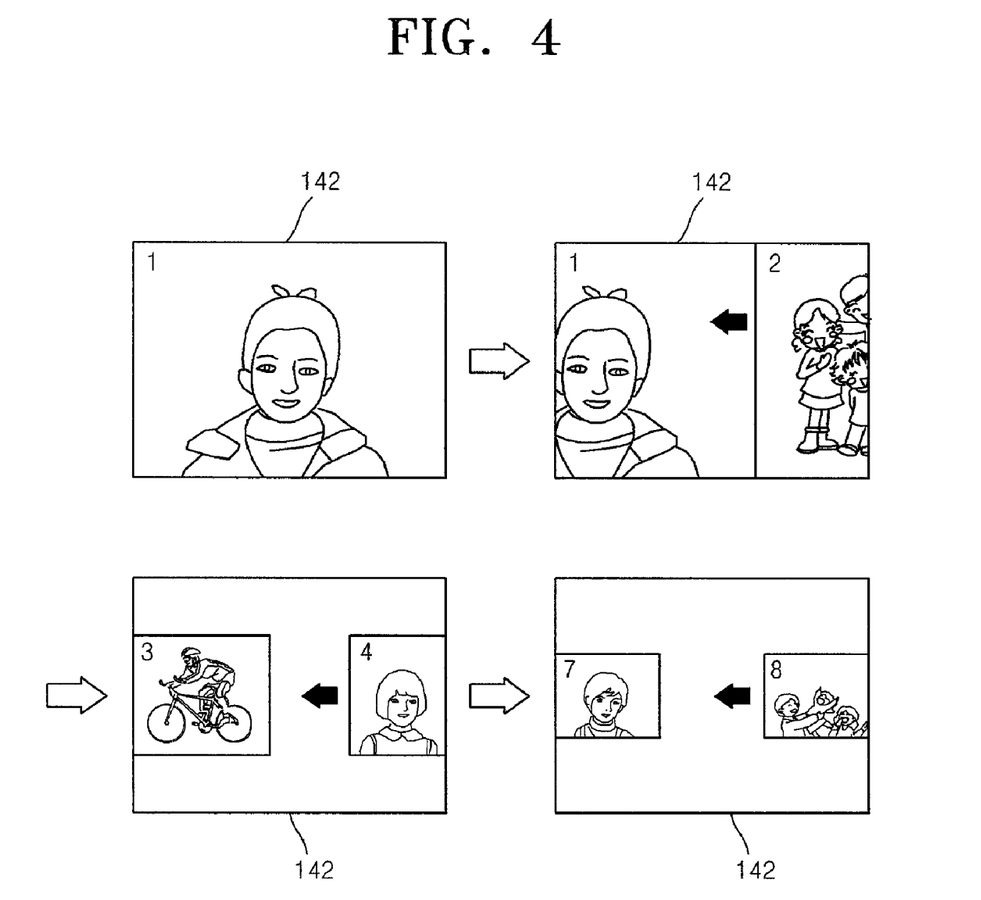
FIG. 4 is a diagram showing a method of browsing images in the digital image processing apparatus, according to another embodiment of the present invention.
Figure 5:
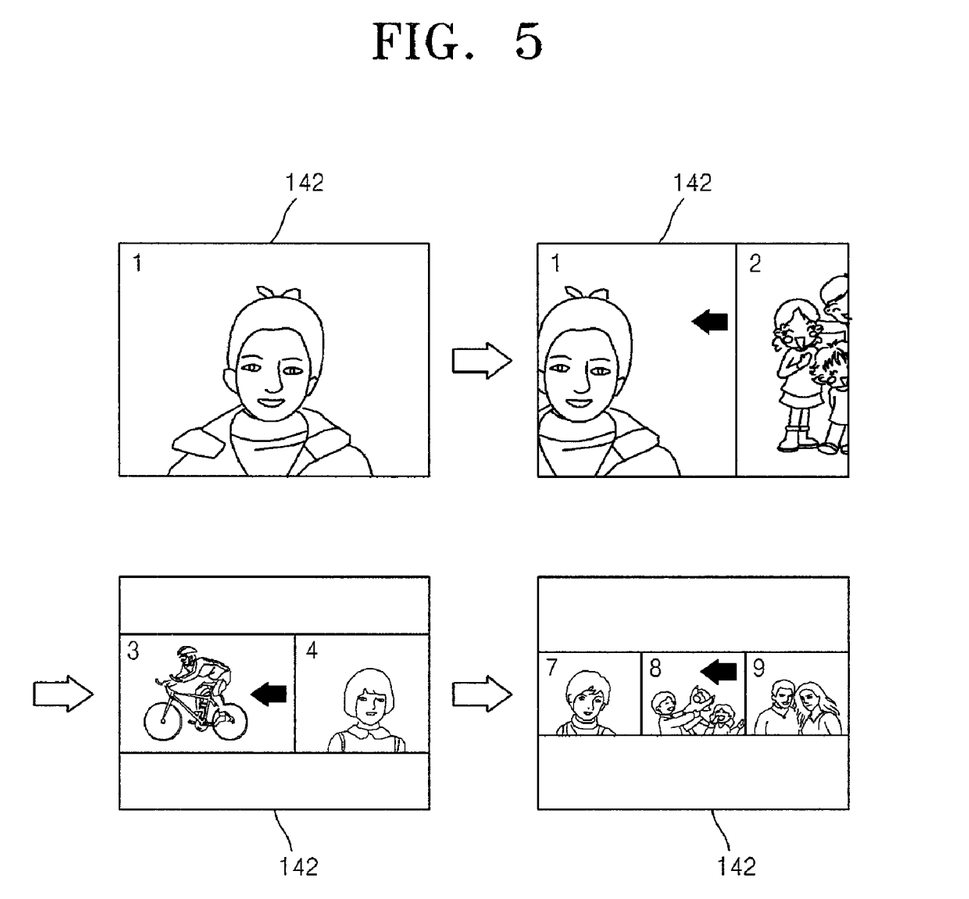
FIG. 5 is a diagram showing a method of browsing images in the digital image processing apparatus, according to another embodiment of the present invention.

Referring to FIGS. 3 through 5, methods of browsing images in the digital image processing apparatus 100, according to an embodiment of the present invention, will be described hereinafter in closer detail.

FIG. 3 is a diagram showing a method of browsing images in the digital image processing apparatus 100, according to an embodiment of the present invention. Pictures of FIG. 3 show that images are displayed on the display panel 142.

When a user inputs a control signal to switch a displayed playback image, the playback image generating unit switches a playback image provided to the display unit 140. A playback image can be switched by retrieving a new image data from an image file of the image to be switched to, generating a new image by using the new image data, and providing the new image to the display unit 140. Thus, a first image currently displayed is switched to a next image, that is, a second image. In other words, a displayed playback image can be changed by removing a currently displayed playback image, and displaying a next image or a previous image.

When the control signal is continuously input due to continuous pressing of a button by a user, the detecting unit detects the duration of the input control signal. Either an integrated timer of the main controller 160 or the timing circuit 105 may be used to detect the duration.

When the duration increases, the playback image generating unit changes the speed or rate of switching playback images according to the detected duration. For example, as shown in FIG. 3, the first image may be switched to the second image at a speed of one image per second, and images corresponding to a third image may be switched at a speed of two images per second. Furthermore, if the duration further increases, images corresponding to a seventh image may be switched at a speed of four images per second.

Meanwhile, as described above, the speed of switching playback images may increase step-by-step as the duration of inputting the control signal increases. However, the present invention is not limited thereto, and the speed of switching playback images may also increase either continuously or in a linear fashion. For example, displayed playback images may be switched based on a result of calculating the duration of inputting the control signal and the speed of switching playback images by using equations such as $y=ax+b$. Here, $y$ is the speed of switching playback images, $x$ is the duration of inputting the control signal, and $a$ and $b$ are constants.

Furthermore, as the duration of inputting the control signal or the speed of switching playback images increases, the sizes of generated playback images may be reduced. For the first image and the second image, the images are generated in the largest size since displayed playback images are being switched at a speed of one image per second. However, since displayed playback images are switched at a speed of two images per second from the third image, the images are generated in smaller sizes as compared to the first image and the second image. In this regard, the seventh image is generated in a smaller size as compared to the third image.

FIG. 4 is a diagram showing a method of browsing images in the digital image processing apparatus 100, according to another embodiment of the present invention. Pictures of FIG. 4 also show that images are displayed on the display panel 142, as the pictures of FIG. 3.

In the current embodiment, as shown in FIG. 4, the playback image generating unit may change a speed of switching playback images based on the detected duration of inputting a control signal. Furthermore, as the duration of inputting the control signal or the speed of switching playback images increases, the sizes of generated playback images may be reduced.

In the embodiment shown in FIG. 3, the displayed playback images are switched by removing a currently displayed playback image, and displaying either a previous image or a next image; however, in the current embodiment, the displayed playback images are switched by sliding out a currently displayed playback image and sliding in a next playback image.

Referring to FIG. 4, in response to a control signal input by a user, the first image slides out to the left and the second image slides in from the right.

In this regard, even when the sizes of playback images are reduced, the displayed playback images are switched by sliding images in and out. However, when the sizes of playback images are reduced, a blank space surrounds the displayed playback images. Thus, the blank space and the displayed playback images may slide in and out together. As shown in the third picture in FIG. 4, the third image and the fourth image slide, and thus, playback images slide with blank spaces, having predetermined sizes, therebetween.

Furthermore, as shown in the fourth picture in FIG. 4, the seventh image and the eighth image slide, and thus, the sizes of playback images may be reduced as the duration of inputting the control signal or the speed of switching playback images increases. Thus, the sizes of blank spaces between a currently displayed playback image and a next playback image may further increase.

FIG. 5 is a diagram showing a method of browsing images in the digital image processing apparatus 100, according to another embodiment of the present invention. Pictures of FIG. 5 also show that images are displayed on the display panel 142, as the pictures of FIGS. 3 and 4.

In the current embodiment, as shown in FIG. 5, the playback image generating unit may change a speed of switching playback images based on the detected duration of inputting a control signal. Furthermore, as the duration of inputting the control signal or the speed of switching playback images increases, the sizes of generated playback images may be reduced.

In the embodiment shown in FIG. 3, the displayed playback images are switched by removing a currently displayed playback image, and displaying either a previous image or a next image; however, in the current embodiment, displayed playback images are switched by sliding out a currently displayed playback image and sliding in a next playback image without a blank space between therebetween.

Referring to FIG. 5, in response to a control signal input by a user, the first image slides out to the left and the second image slides in from the right.

In this regard, even when the sizes of playback images are reduced, the displayed playback images are switched by sliding images in and out. However, when the sizes of playback images are reduced, images are connected to each other and are slided and there is no blank space between a currently displayed playback image and a next playback image, unlike the embodiment of FIG. 4. In other words, an end of the currently displayed playback image and an end of the next playback image are connected to each other, so that images are displayed as sliding in a continuous row. As shown in the third picture of FIG. 5, the third image and the forth image slide, and thus, the right end of the currently displayed playback image and the left end of the next playback image are connected.

Furthermore, as shown in the fourth picture of FIG. 5, the seventh through ninth images are switched by sliding together, the sizes of playback images are reduced as the speed of switching playback images increases, and the images are sequentially connected and slide.

As described in the embodiments of FIGS. 3 through 5, an image desired by a user can be searched for faster as compared to a conventional method by detecting a duration of inputting the control signal instructing to switch displayed playback images and changing a speed of switching playback images according to the detected duration.

Furthermore, as the speed of switching playback images increases, the speed of processing image data in the playback image generating unit needs to be increased, and thus, a load to the playback image generating unit increases. Therefore, the sizes of generated playback images are reduced as the speed of switching playback images increases to reduce the load to the playback image generating unit.

Furthermore, when displayed playback images are switched, switching a currently displayed playback image and a next playback image by sliding the images may give more satisfaction to a user using the digital image processing apparatus.

Meanwhile, it is preferable that images corresponding to all image files are generated and displayed in sequence without partially skipping image files even if the speed of switching playback images increases. If the speed of switching playback images increases sufficiently, it takes not much time for a user to find a desired image. Furthermore, this prevents a possibility that a user fails to find a desired image because the desired image is included in the skipped images.

In the embodiments of FIGS. 3 through 5, a case where a user inputs a control signal instructing to switch a currently displayed playback image to a next playback image is described. However, the embodiments also apply to a case where a user inputs a control signal instructing to switch a currently displayed playback image to a previous playback image, and in this case, displayed playback images will slide from the left to the right.

Figure 6:
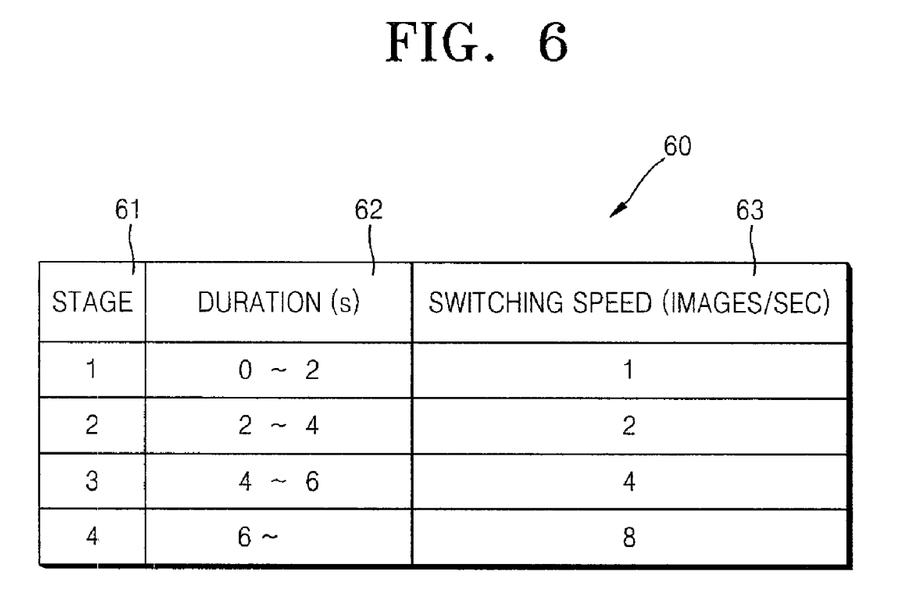
FIG. 6 shows a look-up table for determining the speed of switching playback images, according to an embodiment of the present invention.

FIG. 6 shows a look-up table 60 for determining the speed of switching playback images, according to an embodiment of the present invention. The look-up table 60 may include items indicating a stage 61, a duration 62, and image switching speed 63.

As described in the embodiments of FIGS. 3 through 5, the speed of switching playback images may increase as the duration of inputting the control signal increases. In this case, as shown in FIG. 6, the duration of inputting the control signal is divided into a plurality of ranges, and different rates of switching displayed playback images may be set respectively to the ranges.

Referring to FIG. 6, a speed of switching playback images when the duration of inputting the control signal is within 2 seconds is set to one image per second (a first stage). A speed of switching playback images when the duration of inputting the control signal is between 2 and 4 seconds is set to two images per second (a second stage). Furthermore, a speed of switching playback images when the duration of inputting the control signal is between 4 and 6 seconds is set to four images per second (a third stage), and the speed of switching playback images when the duration of inputting the control signal is longer than 6 seconds is set to eight images per second (a fourth stage).

Accordingly, the speed of switching playback images may be changed step-by-step according to the duration of inputting the control signal.

Meanwhile, when the speed of switching playback images is changed step-by-step as described above, it will be easier to change the size of displayed playback images as compared to the case where the speed of switching playback images is changed either continuously or in a linear fashion.

For example, an image with the largest size may be generated in the first stage, and the size of displayed playback images may be reduced step-by-step as the speed of switching playback images is shifted toward the fourth stage.

The table shown in FIG. 6 is merely an example, and various changes may be made for a standard for dividing the duration of inputting a control signal, the speed of switching playback images, etc.

Figure 7:
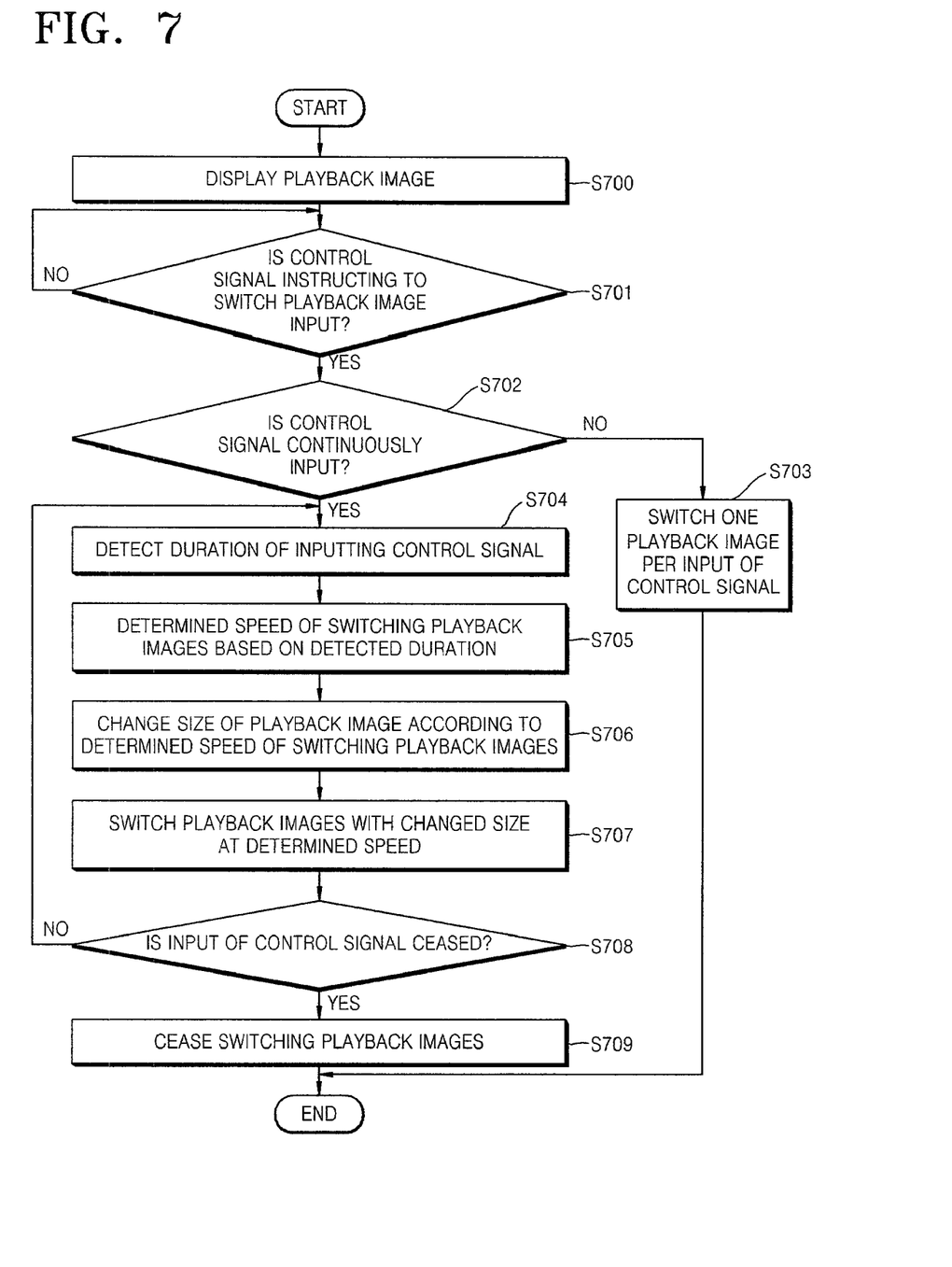
FIG. 7 is a flowchart of a method of controlling a digital image processing apparatus, according to an embodiment of the present invention.

FIG. 7 is a flowchart of a method of controlling a digital image processing apparatus, according to an embodiment of the present invention.

Referring to FIG. 7, a playback image is displayed when image playback mode is selected by a signal input by a user (operation S700). A displayed playback image may be an image corresponding to image data included in an image file from among image files stored in a recording medium. Furthermore, a displayed playback image may be an image corresponding to image data included in an image file generated the most recently.

After a playback image is displayed, it is determined whether a control signal instructing to switch the displayed playback image is input from a user (operation S701). If the control signal is input, it is determined whether the control signal is continuously input (operation S702).

If the control signal is not continuously input, displayed playback images are sequentially switched once per application of a control signal, as in a conventional method (operation S703).

Otherwise, if the control signal is continuously applied, the duration of inputting the control signal is detected (operation S704).

According to the detected duration, the speed of switching playback images is determined (operation S705). The speed of switching playback images either continuously or in a linear fashion can be set in proportion to the detected duration. Furthermore, the detected duration may be divided into a plurality of ranges and the speed of switching playback images may be set to be changed step-by-step in each of the ranges.

The size of a playback image may be changed according to the determined speed (operation S706).

When the speed of switching playback images and the size of the playback image are changed, the displayed playback images having changed sizes are switched at the determined speed (operation S707). The displayed playback images may be switched by removing a currently displayed playback image, and displaying a next playback image. Furthermore, the displayed playback images may also be switched by sliding a currently displayed playback image and a next playback image. Furthermore, in case where the displayed playback images may be switched by sliding a currently displayed playback image and a next playback image, an end of the currently displayed playback image and an end of the next playback image may be connected to each other before the currently displayed playback image and the next playback image slide.

Furthermore, it is preferable that images corresponding to all image files are generated and displayed in sequence without partially skipping image files, even if the speed of switching playback images increases. If the speed of switching playback images increases sufficiently, it takes not much time for a user to find a desired image. Furthermore, this prevents a possibility that a user fails to find a desired image because the desired image is included in the skipped images.

While operations S704 through S707 are being performed, it is continuously determined whether the input of the control signal has ceased (operation S708). According to the determination result, if it is determined that the input of the control signal has not ceased, the duration of inputting the control signal is continuously detected and operations S704 through S707 are repeated. Otherwise, if it is determined that the input of the control signal has ceased, switching of displayed playback images is ceased (operation S709).

Although not shown in FIG. 7, operations S702 through S709 will be repeated if a control signal instructing to switch a displayed signal is input again by a user.

Accordingly, an image desired by a user can be searched for faster as compared to a conventional method by detecting the duration of inputting the control signal instructing to switch displayed playback images and changing the speed of switching playback images according to the detected duration.

Furthermore, the sizes of generated playback images are reduced as the speed of switching playback images increases, and thus, a load to the playback image generating unit can be reduced.

Furthermore, when displayed playback images are switched, a currently displayed playback image and a next playback image are switched by sliding the images. Thus, a digital image processing apparatus according to the present invention may give more satisfaction to a user.

Figure 8:
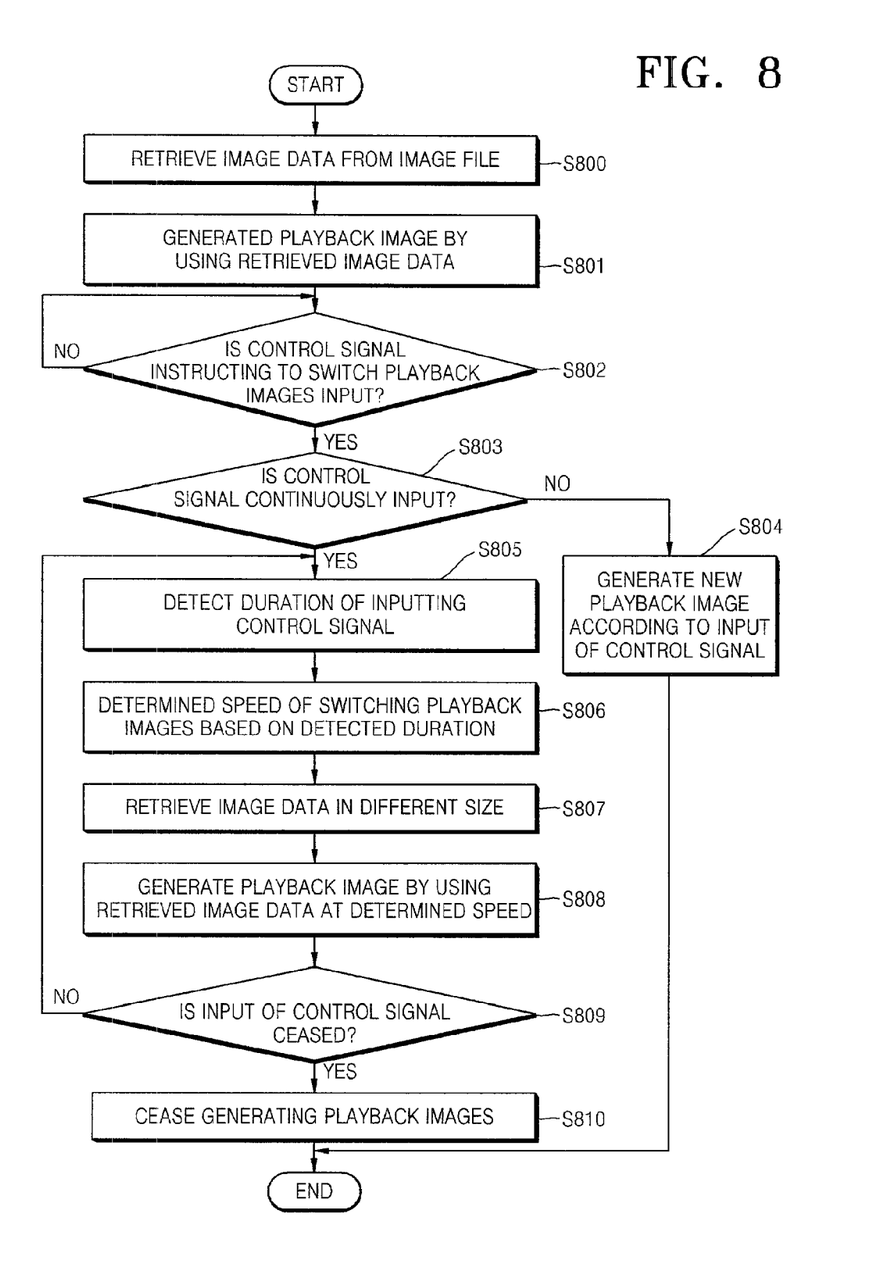
FIG. 8 is a flowchart of a method of controlling a digital image processing apparatus, according to an embodiment of the present invention.

FIG. 8 is a flowchart of a method of controlling a digital image processing apparatus, according to another embodiment of the present invention, wherein the method focuses on an operation of generating playback images.

Referring to FIG. 8, when image playback mode is selected by a signal input by a user, image data is retrieved from an image file (operation S800). The image file from which image data is retrieved may be an image file of image files stored in a recording medium. Furthermore, the image file may be the newest image file from among the image files stored in the recording medium.

When the image data is retrieved, a playback image is generated with the retrieved image data (operation S801). The generated playback image will be provided to a display unit and displayed on the display unit.

After the playback image is generated and displayed, it is determined whether a control signal instructing to switch the displayed playback image is input from a user (operation S802). If the control signal is input, it is determined whether the control signal is continuously applied (operation S803).

If the control signal is not continuously applied, a new playback image is generated in response to the control signal, as in a conventional method (operation S804).

Otherwise, if the control signal is continuously applied, the duration of inputting the control signal is detected (operation S805).

The speed of switching playback images is determined according to the detected duration (operation S806). The speed of switching playback images either continuously or in a linear fashion may be set in proportion to the detected duration. Furthermore, the detected duration may be divided into a plurality of ranges and the speed of switching playback images may be set to be changed step-by-step in each of the ranges.

Furthermore, to change the size of displayed playback images according to the determined speed, image data in a different size is retrieved from the image file (operation S807). Thus, each of the image files is required to include image data in various sizes.

A playback image is generated with the image data in a different size according to the determined speed (operation S808). The generated playback image may be provided to the display unit after a currently displayed playback image is removed. In this case, displayed playback images are switched by removing a currently displayed playback image and displaying a next playback image. Furthermore, displayed playback images may be switched by providing a next playback image to the display unit, connecting the next playback image to the currently displayed playback image and sliding the connected images.

While operations S805 through S808 are being performed, it is continuously determined whether the input of the control signal has ceased (operation S809). According to the determination result, if it is determined that the input of the control signal has not ceased, the duration of inputting the control signal is continuously detected and operations S805 through S808 are repeated. Otherwise, if it is determined that the input of the control signal has ceased, switching of displayed playback images is ceased (operation S810).

Although not shown in FIG. 8, operations S803 through S810 will be repeated if a control signal instructing to switch displayed signal is input again by a user.

A computer program for executing a method of controlling a digital image processing apparatus, according to the embodiments described above and variants thereof, may be stored in a storage medium. Here, the storage medium may be the storage unit 120 or the recording medium 121, shown in FIG. 2A. Here, examples of the recording medium include magnetic storage media (e.g., ROM, floppy disks, hard disks, etc.) and optical recording media (e.g., CD-ROMs, or DVDs). Furthermore, the recording medium may also be the main controller 160 of FIG. 2 or a part of the same.

Accordingly, an image desired by a user can be searched for faster as compared to a conventional method by detecting a duration of inputting the control signal instructing to switch displayed playback images, and by changing a speed of switching playback images according to the detected duration.

Furthermore, the sizes of generated playback images are reduced as the speed of switching playback images increases, and thus, the load to the playback image generating unit can be reduced.

Furthermore, when displayed playback images are switched, a currently displayed playback image and a next playback image are switched by sliding the images. Thus, a digital image processing apparatus according to the present invention may give more satisfaction to a user.

While this invention has been particularly shown and described with reference to preferred embodiments thereof, it will be understood by those of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for digital image playback, comprising: a playback image generating unit that generates a plurality of playback images from image data extracted from an image file; a display unit that receives the plurality of playback images from the playback image generating unit and displays the plurality of playback images; a user input unit that generates a control signal in response to an input; and a detecting unit that receives the control signal and determines a duration of the control signal, wherein the playback image generating unit switches among the plurality of playback images provided to the display unit in response to the control signal at a specified frame rate that varies with the duration determined by the detecting unit, and wherein the playback image generating unit decreases a displayed size of the plurality of playback images while the playback image generating unit switches among the plurality of playback images.

2. The apparatus of claim 1, wherein the playback image generating unit continuously increases the specified frame rate as the duration determined by the detecting unit increases.

3. The apparatus of claim 1, wherein the playback image generating unit increases the specified frame rate by a discrete amount at specified intervals as the duration determined by the detecting unit increases.

4. The apparatus of claim 1, wherein the displayed size of the plurality of playback images decreases as the duration determined by the detecting unit increases.

5. The apparatus of claim 1, wherein the playback image generating unit connects an edge of a first of the plurality of playback images to an edge of a second of the plurality of playback images.

6. The apparatus of claim 1, wherein the playback image generating unit stops switching among the plurality of playback images when the input of the control signal has ceased.

7. An apparatus for digital image playback, comprising: a means for processing a plurality of playback images from image data extracted from an image file; a means for displaying the plurality of playback images received from the means for processing; a means for generating a control signal; and a means for detecting a duration of the control signal, wherein the means for processing switches among the plurality of playback images provided to the means for displaying in response to the control signal at a specified frame rate that varies with the duration determined by the means for detecting, the means for processing also decreases a displayed size of the plurality of playback images while switching among the plurality of playback images.

8. The apparatus of claim 7, wherein the means for processing continuously increases the specified frame rate as the duration determined by the means for detecting increases.

9. The apparatus of claim 7, wherein the means for processing increases the specified frame rate by a discrete amount at specified intervals as the duration determined by the means for detecting increases.

10. The apparatus of claim 7, wherein the displayed size of the plurality of playback images decreases as the duration determined by the means for detecting increases.

11. A method of controlling a digital image processing apparatus that generates a playback image by using image data included in an image file and displays the playback image, the method comprising: switching a currently displayed playback image to either a next playback image or a previous playback image, in response to a control signal input by a user; and changing a frame rate of switching playback images according to a duration of inputting the control signal, wherein a size of a playback image is reduced as the speed of switching playback images increases.

12. The method of claim 11, wherein the frame rate of switching playback images is changed continuously as the duration of inputting the control signal increases.

13. The method of claim 11, wherein the frame rate of switching playback images is changed step-by-step as the duration of inputting the control signal increases.

14. The method of claim 11, wherein playback images are sequentially generated with respect to all stored image files according to the control signal.

15. The method of claim 11, wherein, if the input of the control signal has ceased, the switching of the images is ceased.

* * * * *